(12) United States Patent
Beauharnois

(10) Patent No.: US 8,992,846 B2
(45) Date of Patent: *Mar. 31, 2015

(54) EXHAUST GAS TREATMENT DEVICE

(71) Applicant: Unifrax I LLC, Tonawanda, NY (US)

(72) Inventor: Mark Beauharnois, Buffalo, NY (US)

(73) Assignee: Unifrax I LLC, Tonawanda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/225,855

(22) Filed: Mar. 26, 2014

(65) Prior Publication Data

US 2014/0205834 A1 Jul. 24, 2014

Related U.S. Application Data

(63) Continuation of application No. 13/208,522, filed on Aug. 12, 2011, now Pat. No. 8,765,069.

(60) Provisional application No. 61/373,043, filed on Aug. 12, 2010.

(51) Int. Cl.
*B01D 50/00* (2006.01)
*B01D 53/88* (2006.01)
(Continued)

(52) U.S. Cl.
CPC .............. *F01N 3/2853* (2013.01); *B01D 53/88* (2013.01); *B01D 53/944* (2013.01); *B01D 2258/012* (2013.01); *C04B 14/024* (2013.01); *C04B 14/042* (2013.01); *C04B 14/10* (2013.01); *C04B 14/20* (2013.01); *C04B 14/202* (2013.01); *C04B 14/206* (2013.01); *C04B 14/38* (2013.01); *C04B 14/40* (2013.01); *C04B 14/42* (2013.01); *C04B 14/4625* (2013.01); *C04B 14/4656* (2013.01);
(Continued)

(58) Field of Classification Search
USPC .......................................... 422/177, 179, 180
See application file for complete search history.

(56) References Cited

U.S. PATENT DOCUMENTS 3,012,923 A 12/1961 Slayter
3,224,927 A 12/1965 Brown et al.
(Continued)

FOREIGN PATENT DOCUMENTS

DE 3925845 2/1991
DE 196 38 542 A1 3/1997
(Continued)

OTHER PUBLICATIONS

Gulati, Ten Eyck & Lebold. "Durable Packaging Design for Cordierite Ceramic Catalysts for Motorcycle Application" Society of Automotive Engineers Meeting, Detroit, MI, Mar. 1, 1993.
(Continued)

*Primary Examiner* — Tom Duong
(74) *Attorney, Agent, or Firm* — Curatolo Sidoti Co., LPA; Joseph G. Curatolo; Salvatore A. Sidoti

(57) ABSTRACT

A mounting mat for an exhaust gas treatment device includes a blend of inorganic fibers and organic nanofibrillated fibers. An exhaust gas treatment device includes a housing and a fragile structure mounted within the housing by the mounting mat that is disposed in a gap between the housing and the fragile catalyst support structure. Additionally disclosed are methods of making a mounting mat for an exhaust gas treatment device and for making an exhaust gas treatment device incorporating the mounting mat.

24 Claims, 3 Drawing Sheets

(51) Int. Cl.

| | | |
|---|---|---|
| *B01D 53/94* | (2006.01) | |
| *C04B 14/02* | (2006.01) | |
| *C04B 14/04* | (2006.01) | |
| *C04B 14/10* | (2006.01) | |
| *C04B 14/20* | (2006.01) | |
| *C04B 14/38* | (2006.01) | |
| *C04B 14/40* | (2006.01) | |
| *C04B 14/42* | (2006.01) | |
| *C04B 14/46* | (2006.01) | |
| *C04B 16/06* | (2006.01) | |
| *C04B 18/24* | (2006.01) | |
| *C04B 20/00* | (2006.01) | |
| *C04B 26/02* | (2006.01) | |
| *C04B 26/06* | (2006.01) | |
| *F01N 3/28* | (2006.01) | |
| *C04B 103/63* | (2006.01) | |
| *C04B 111/00* | (2006.01) | |

(52) U.S. Cl.
CPC .............. *C04B 16/065* (2013.01); *C04B 18/24* (2013.01); *C04B 20/006* (2013.01); *C04B 26/02* (2013.01); *C04B 26/06* (2013.01); *C04B 2103/63* (2013.01); *C04B 2111/00793* (2013.01); *C04B 2111/0081* (2013.01); *F01N 3/2857* (2013.01); *Y10T 428/268* (2013.01)
USPC ........................................................ 422/179

(56) References Cited

U.S. PATENT DOCUMENTS

| | | | |
|---|---|---|---|
| 3,510,394 A | 5/1970 | Cadotte | |
| 3,649,406 A | 3/1972 | McNish | |
| 3,674,621 A | 7/1972 | Miyamoto et al. | |
| 3,771,967 A | 11/1973 | Nowak | |
| 3,798,006 A | 3/1974 | Balluff | |
| 3,916,057 A | 10/1975 | Hatch et al. | |
| 3,957,573 A | 5/1976 | Miyamoto et al. | |
| 3,996,145 A | 12/1976 | Hepburn | |
| 4,011,651 A | 3/1977 | Bradbury et al. | |
| 4,048,363 A | 9/1977 | Langer et al. | |
| 4,093,423 A | 6/1978 | Neumann | |
| 4,101,280 A | 7/1978 | Frietzsche et al. | |
| 4,142,864 A | 3/1979 | Rosynsky et al. | |
| 4,156,533 A | 5/1979 | Close et al. | |
| 4,204,907 A | 5/1980 | Korklan et al. | |
| 4,239,733 A | 12/1980 | Foster et al. | |
| 4,269,807 A | 5/1981 | Bailey et al. | |
| 4,269,887 A | 5/1981 | Sonobe et al. | |
| 4,271,228 A | 6/1981 | Foster et al. | |
| 4,279,864 A | 7/1981 | Nara et al. | |
| 4,305,992 A | 12/1981 | Langer et al. | |
| 4,328,187 A | 5/1982 | Musall et al. | |
| 4,332,852 A | 6/1982 | Korklan et al. | |
| 4,335,077 A | 6/1982 | Santiago et al. | |
| 4,353,872 A | 10/1982 | Midorikawa | |
| 4,385,135 A | 5/1983 | Langer et al. | |
| 4,443,517 A | 4/1984 | Shah | |
| 4,447,345 A | 5/1984 | Kummermehr et al. | |
| 4,454,190 A | 6/1984 | Katagiri | |
| 4,617,176 A | 10/1986 | Merry | |
| 4,693,338 A | 9/1987 | Clerc | |
| 4,698,213 A | 10/1987 | Shimozi et al. | |
| 4,735,757 A | 4/1988 | Yamamoto et al. | |
| 4,746,570 A | 5/1988 | Suzaki et al. | |
| 4,752,515 A | 6/1988 | Hosoi et al. | |
| 4,797,263 A | 1/1989 | Oza | |
| 4,823,845 A | 4/1989 | Martin et al. | |
| 4,849,382 A | 7/1989 | Shibata et al. | |
| 4,863,700 A | 9/1989 | Ten Eyck | |
| 4,865,818 A | 9/1989 | Merry et al. | |
| 4,927,608 A | 5/1990 | Wörner et al. | |
| 4,929,429 A | 5/1990 | Merry | |
| 4,985,212 A | 1/1991 | Kawakami et al. | |
| 4,999,168 A | 3/1991 | Ten Eyck | |
| 5,002,836 A | 3/1991 | Dinwoodie et al. | |
| 5,008,086 A | 4/1991 | Merry | |
| 5,032,441 A | 7/1991 | Ten Eyck et al. | |
| 5,073,432 A | 12/1991 | Horikawa et al. | |
| 5,079,280 A | 1/1992 | Yang et al. | |
| 5,094,073 A | 3/1992 | Wörner et al. | |
| 5,094,074 A | 3/1992 | Nishizawa et al. | |
| 5,119,551 A | 6/1992 | Abbott | |
| 5,139,615 A | 8/1992 | Conner et al. | |
| 5,145,811 A | 9/1992 | Lintz et al. | |
| 5,151,253 A | 9/1992 | Merry et al. | |
| 5,167,765 A | 12/1992 | Nielsen et al. | |
| 5,242,871 A | 9/1993 | Hashimoto et al. | |
| 5,250,269 A | 10/1993 | Langer | |
| 5,254,410 A | 10/1993 | Langer et al. | |
| 5,258,216 A | 11/1993 | Von Bonin et al. | |
| 5,290,522 A | 3/1994 | Rogers et al. | |
| 5,332,609 A | 7/1994 | Corn | |
| 5,340,643 A | 8/1994 | Ou et al. | |
| 5,376,341 A | 12/1994 | Gulati | |
| 5,380,580 A | 1/1995 | Rogers et al. | |
| 5,389,716 A | 2/1995 | Graves | |
| 5,419,975 A | 5/1995 | Lintz et al. | |
| 5,453,116 A | 9/1995 | Fischer et al. | |
| 5,482,686 A | 1/1996 | Lebold et al. | |
| 5,488,826 A | 2/1996 | Paas | |
| 5,502,937 A | 4/1996 | Wilson | |
| 5,523,059 A | 6/1996 | Langer | |
| 5,567,536 A | 10/1996 | Lintz et al. | |
| 5,580,532 A | 12/1996 | Robinson et al. | |
| 5,666,726 A | 9/1997 | Robinson et al. | |
| 5,736,109 A | 4/1998 | Howorth et al. | |
| 5,811,063 A | 9/1998 | Robinson et al. | |
| 5,853,675 A | 12/1998 | Howorth | |
| 5,862,590 A | 1/1999 | Sakashita et al. | |
| 5,869,010 A | 2/1999 | Langer | |
| 5,882,608 A | 3/1999 | Sanocki et al. | |
| 5,955,177 A | 9/1999 | Sanocki et al. | |
| 6,000,131 A | 12/1999 | Schmitt | |
| 6,051,193 A | 4/2000 | Langer et al. | |
| 6,101,714 A | 8/2000 | Schmitt | |
| 6,158,120 A | 12/2000 | Foster et al. | |
| 6,162,404 A | 12/2000 | Tojo et al. | |
| 6,183,852 B1 | 2/2001 | Rorabaugh et al. | |
| 6,185,820 B1 | 2/2001 | Foster | |
| 6,231,818 B1 | 5/2001 | Ten Eyck | |
| 6,251,224 B1 | 6/2001 | Dong | |
| 6,267,843 B1 | 7/2001 | Helwig et al. | |
| 6,317,976 B1 | 11/2001 | Aranda et al. | |
| 6,468,932 B1 | 10/2002 | Robin et al. | |
| 6,589,488 B1 | 7/2003 | Eyhorn | |
| 6,726,884 B1 | 4/2004 | Dillon et al. | |
| 6,733,628 B2 | 5/2004 | Dinwoodie et al. | |
| 6,737,146 B2 | 5/2004 | Schierz et al. | |
| 6,756,107 B1 | 6/2004 | Schierz et al. | |
| 6,855,298 B2 | 2/2005 | Ten Eyck | |
| 6,923,942 B1 | 8/2005 | Shirk et al. | |
| 7,033,412 B2 | 4/2006 | Kumar et al. | |
| 7,153,796 B2 | 12/2006 | Jubb et al. | |
| 7,160,503 B2 | 1/2007 | Weaver | |
| 7,261,864 B2 | 8/2007 | Watanabe | |
| 7,276,280 B2 | 10/2007 | Dinwoodie et al. | |
| 7,387,822 B2 | 6/2008 | Dinwoodie | |
| 7,442,347 B2 | 10/2008 | Yoshimi et al. | |
| 7,550,118 B2 | 6/2009 | Merry | |
| 7,820,117 B2 | 10/2010 | Peisert et al. | |
| 7,887,917 B2 | 2/2011 | Zoitos et al. | |
| 7,971,357 B2 | 7/2011 | Ten Eyck et al. | |
| 2001/0036427 A1 | 11/2001 | Yamada et al. | |
| 2002/0025750 A1 | 2/2002 | Dinwoodie | |
| 2002/0025904 A1 | 2/2002 | Goto et al. | |
| 2002/0127154 A1 | 9/2002 | Foster et al. | |
| 2003/0049180 A1 | 3/2003 | Fukushima | |
| 2003/0056861 A1 | 3/2003 | Weaver | |
| 2003/0185724 A1 | 10/2003 | Anji et al. | |
| 2003/0185725 A1 | 10/2003 | Mutou et al. | |
| 2004/0052694 A1 | 3/2004 | Nishikawa et al. | |

(56) References Cited

U.S. PATENT DOCUMENTS

| | | |
|---|---|---|
| 2004/0234436 A1 | 11/2004 | Howorth |
| 2005/0272602 A1 | 12/2005 | Ninomiya |
| 2006/0070554 A1 | 4/2006 | Braunreiter et al. |
| 2006/0153746 A1 | 7/2006 | Merry et al. |
| 2006/0154040 A1 | 7/2006 | Merry |
| 2006/0278323 A1 | 12/2006 | Eguchi |
| 2007/0065349 A1 | 3/2007 | Merry |
| 2007/0207069 A1 | 9/2007 | Kariya et al. |
| 2007/0218320 A1 | 9/2007 | Weaver |
| 2008/0160856 A1 | 7/2008 | Chen et al. |
| 2008/0160956 A1* | 7/2008 | Jackson et al. ............ 455/406 |
| 2008/0178566 A1 | 7/2008 | Okabe |
| 2008/0253939 A1 | 10/2008 | Hornback |
| 2009/0041967 A1 | 2/2009 | Tomosue et al. |
| 2009/0060800 A1 | 3/2009 | Fernandez, Jr. |
| 2009/0060802 A1* | 3/2009 | Beauharnois ............ 422/177 |
| 2009/0114097 A1 | 5/2009 | Saiki |
| 2009/0162256 A1 | 6/2009 | Ten Eyck et al. |
| 2009/0208384 A1 | 8/2009 | Merry |
| 2010/0055004 A1 | 3/2010 | Olson et al. |
| 2010/0173552 A1 | 7/2010 | Fernando et al. |
| 2010/0207298 A1 | 8/2010 | Kunze et al. |
| 2010/0209306 A1 | 8/2010 | Kunze et al. |
| 2010/0209308 A1 | 8/2010 | Kunze et al. |
| 2010/0266462 A1 | 10/2010 | Kumar |
| 2011/0023430 A1 | 2/2011 | Kumar et al. |
| 2011/0033343 A1 | 2/2011 | Fernandes, Jr. |
| 2011/0036063 A1 | 2/2011 | Kumar |
| 2011/0094419 A1 | 4/2011 | Fernando et al. |
| 2011/0097246 A1 | 4/2011 | Beauharnois et al. |
| 2011/0123417 A1 | 5/2011 | Ten Eyck et al. |
| 2011/0126499 A1 | 6/2011 | Kumar |
| 2011/0150715 A1 | 6/2011 | Kumar |
| 2011/0150717 A1 | 6/2011 | Kumar et al. |
| 2012/0100046 A1 | 4/2012 | Kelsall et al. |

FOREIGN PATENT DOCUMENTS

| | | |
|---|---|---|
| DE | 199 57 692 A1 | 5/2001 |
| EP | 0 205 704 A2 | 12/1986 |
| EP | 0 279 511 A2 | 8/1988 |
| EP | 0 319 299 A2 | 6/1989 |
| EP | 0 328 293 A1 | 8/1989 |
| EP | 0 396 331 A1 | 11/1990 |
| EP | 0 398 130 A2 | 11/1990 |
| EP | 0 465 203 A1 | 1/1992 |
| EP | 0 508 751 A2 | 10/1992 |
| EP | 0 551 532 A1 | 7/1993 |
| EP | 0 573 834 A1 | 12/1993 |
| EP | 0 643 204 A2 | 3/1995 |
| EP | 0 765 993 A1 | 4/1997 |
| EP | 0 803 643 A1 | 10/1997 |
| EP | 1 267 048 A1 | 12/2002 |
| EP | 1 336 678 B1 | 10/2004 |
| EP | 1 495 807 A1 | 1/2005 |
| EP | 1 533 409 A1 | 5/2005 |
| EP | 1 348 679 B1 | 1/2006 |
| EP | 1 696 110 A1 | 8/2006 |
| EP | 1 830 043 A1 | 9/2007 |
| EP | 1 905 895 A1 | 4/2008 |
| EP | 1 931 862 A1 | 6/2008 |
| EP | 1 950 035 A1 | 7/2008 |
| GB | 1 438 762 A | 6/1976 |
| GB | 1 438 784 A | 6/1976 |
| GB | 1 513 808 A | 6/1978 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 4-83773 A | 3/1992 |
| JP | 6-272549 A | 9/1994 |
| JP | 7-286514 A | 10/1995 |
| JP | 2006-177368 A | 7/2006 |
| WO | WO 91/11498 A1 | 8/1991 |
| WO | WO 93/23245 | 11/1993 |
| WO | WO 94/24425 | 10/1994 |
| WO | WO 97/02413 | 1/1997 |
| WO | WO 97/32118 A1 | 9/1997 |
| WO | WO 98/04404 | 2/1998 |
| WO | WO 99/23370 A1 | 5/1999 |
| WO | WO 99/46028 A1 | 9/1999 |
| WO | WO 00/75496 A1 | 4/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2005/106222 | 11/2005 |
| WO | WO 2006/065534 | 6/2006 |
| WO | WO 2007/143437 | 12/2007 |
| WO | WO 2008/059249 | 5/2008 |
| WO | WO 2008/103525 A2 | 8/2008 |
| WO | WO 2008/154078 A1 | 12/2008 |
| WO | WO 2008/156942 A1 | 12/2008 |
| WO | WO 2011/067598 | 6/2011 |

OTHER PUBLICATIONS

Maret, Gulati, Lambert & Zink, Systems Durability of a Ceramic Racetrack Converter. International Fuels and Lubricants Meeting, Toronto, Canada, Oct. 7-10, 1991.

English language abstract of DE 19858025; Publication Date: Jun. 21, 2000; Applicant: Aslgawo GmbH.

Tosa Shin'ichi, et al., "The Development of Converter Canning Technology for Thin Wall Substrate." Honda R&D Tech. Rev., vol. 12, No. 1, pp. 175-182, Japan (2000).

Product Brochure—"There's More to it Than You Think, HDK—Pyrogenic Silica", Wacker Silicones, 6173/10.05/e.

Technical Data Sheet—"HDK N20 Pyrogenic Silica", Wacker Silicones, Version 1.0, Jun. 12, 2008.

Sutherland, Nancy Ross; Freeness of Pulp (Canadian Standard Method, Revision of T 227 om-04); Jun. 2008; 080809.05; T 227, draft No. 2, Technical Association of the Pulp and Paper Industry TAPPI).

Gagnon Jr., Gerard R., et al.; The Effect of Nano-Fibrillated Cellulose on the Mechanical Properties of Polymer Films; Sep. 28-30, 2010; 19 pps.; Technical Association of the Pulp and Paper Industry (TAPPI).

"EFTec Nanofibrillated Fibers"; 2007; Document: TDS-003.00; Engineered Fibers Technology.

Gardner, Douglas J., et al.; "Progress on Cellulose Nanofiber-filled Thermoplastic Composites"; Advanced Structures & Composites Center (AEWC) Oct. 14, 2010; Society of Wood Science and Technology International Convention.

Da Silva Perez, Denilson, et al.; "Overview of Cellulose Nanocrystals and Nanofibres: The Science and Technology—A European Perspective"; Jul. 15-17, 2009; Organisation for Co-Operation and Development (OECD) Conference on Potential Environmental Benefits of Nanotechnology: Fostering Safe Innovation-Led Growth.

Homonoff, E.C., et al,; "Nanofibrillated Cellulose Fibers: Where Size Matters in Opening New Markets to Nanofiber Usage"; Jun. 25-27, 2008; Technical Association of the Pulp and Paper Industry (TAPPI) Nanotechnology Conference.

International Search Report, Form PCT-ISA-210, mailed Apr. 9, 2012, for corresponding PCT International Patent Application No. PCT-US2011-047605.

Written Opinion, Form PCT-ISA-237, mailed Apr. 9, 2012, for corresponding PCT International Patent Application No. PCT-US2011-047605.

International Preliminary Report on Patentability, Form PCT-IB-373 for PCT International Patent Application No. PCT-US2011-047605, mailing date Feb. 12, 2013.

* cited by examiner

EXHAUST GAS TREATMENT DEVICE

This application is a continuation application of U.S. Ser. No. 13/208,522 filed on Aug. 12, 2011, which claims the benefit of the filing date under 35 U.S.C. §119(e) from U.S. Provisional Application for Patent Ser. No. 61/373,043 filed on Aug. 12, 2010.

The disclosure relates to a device for the treatment of exhaust gases, such as an automotive catalytic converter or a diesel particulate trap. The exhaust gas treatment device includes a fragile catalyst support structure that is mounted within a housing by a mounting mat located in space between the housing and the fragile catalyst support structure.

Exhaust gas treatment devices are used on automobiles to reduce atmospheric pollution from engine emissions. Examples of widely used exhaust gas treatment devices include catalytic converters and diesel particulate traps.

An illustrative catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

An illustrative diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

The fragile catalyst support structure generally comprises a monolithic structure manufactured from a frangible material of metal or a brittle, ceramic material. These fragile catalyst support structures provide a plurality of gas flow channels. The catalyst support structures can be so fragile that even small shock loads or stresses are often sufficient to crack or crush them. Metallic catalyst support structures may also be mounted within a metal housing utilizing a mounting mat.

In order to protect the fragile catalyst support structure from thermal and mechanical shock and other stresses, as well as to provide thermal insulation and a gas seal, a mounting mat is positioned within the gap between the fragile structure and the housing. The mounting mat should be capable of exerting an effective residual holding pressure on the fragile catalyst support structure to maintain the fragile catalyst support structure in proper position within the housing, even when the exhaust gas treatment device has undergone wide temperature fluctuations.

A mounting mat may contain only inorganic fibers. However, the mounting mat material may also contain organic binders, inorganic binders, and intumescent materials. The inclusion of organic binders in mounting mats has been shown to have detrimental impact on the performance of many commercially available mounting mats. As regulations regarding undesirable emissions become more stringent, there is an effort to reduce the amount of organic binder contained in the mounting mat, as the organic material within the mats contributes to undesirable emissions when burned out during the initial operation of the exhaust gas treatment device.

While it is desirable to reduce the organic content of exhaust gas treatment device mounting mats, there are definite problems encountered with low organic binder-containing mounting mats, such as low density, low tensile strength, and cracking/splitting. What is needed in the art is a mounting mat for exhaust gas treatment devices which has a low organic content and which exhibits the performance properties of mounting mats with higher organic content.

Provided is a mounting mat for an exhaust gas treatment device, the mounting mat comprising a blend of inorganic fibers and organic nanofibrillated fibers. According to certain illustrative embodiments, the mounting mat for the exhaust gas treatment device comprises a blend of inorganic fibers, organic nanofibrillated fibers, and an intumescent material.

Also provided is an exhaust gas treatment device, the device comprising a housing, a fragile structure resiliently mounted within said housing, and a mounting mat disposed in a gap between said housing and said fragile structure, wherein said mounting mat comprises a blend of inorganic fibers and organic nanofibrillated fibers.

According to certain illustrative embodiments, the exhaust gas treatment device comprises a housing, a fragile structure resiliently mounted within said housing, and a mounting mat disposed in a gap between said housing and said fragile structure, wherein said mounting mat comprises a blend of inorganic fibers, organic nanofibrillated fibers, and an intumescent material.

Additionally provided is a method of making an exhaust gas treatment device, the method comprising wrapping a mounting mat comprising a blend of inorganic fibers and organic nanofibrillated fibers around a portion of a fragile structure, and positioning the wrapped fragile structure within a housing.

According to certain illustrative embodiments, the method of making an exhaust gas treatment device comprises wrapping a mounting mat comprising a blend of inorganic fibers, organic nanofibrillated fibers and intumescent material around a portion of a fragile structure, and positioning the wrapped fragile structure within a housing.

Also provided is an exhaust gas treatment device, the device comprising a housing, a fragile catalyst support structure resiliently mounted within said housing, and a mounting mat disposed in a gap between said housing and said fragile structure, wherein said mounting mat comprises a blend of inorganic fibers and organic nanofibrillated fibers.

According to certain illustrative embodiments, the exhaust gas treatment device comprises a housing, a fragile catalyst support structure resiliently mounted within said housing, and a mounting mat disposed in a gap between said housing and said fragile structure, wherein said mounting mat comprises a blend of inorganic fibers, organic nanofibrillated fibers, and an intumescent material.

Additionally provided is a method of making an exhaust gas treatment device, the method comprising wrapping a mounting mat comprising a blend of inorganic fibers and organic nanofibrillated fibers around a portion of a fragile catalyst support structure adapted for treating exhaust gases, and positioning the wrapped fragile catalyst structure within a housing.

According to certain illustrative embodiments, the method of making an exhaust gas treatment device comprises wrapping a mounting mat comprising a blend of inorganic fibers, organic nanofibrillated fibers and intumescent material around a portion of a fragile catalyst support structure adapted for treating exhaust gases, and positioning the wrapped fragile catalyst structure within a housing.

Further provided is a method for making a mounting mat for an exhaust gas treatment device comprising preparing a blend of inorganic fibers and organic nanofibrillated fibers, and forming the blend into a mat. According to certain illustrative embodiments, the method of making the mounting mat for an exhaust gas treatment device comprises preparing a blend of inorganic fibers, organic nanofibrillated fibers and intumescent material, and forming the blend into a mat.

Further provided is an end cone for an exhaust gas treatment device comprising an outer metallic cone, an inner metallic cone, and cone insulation disposed between said outer and inner metallic end cones, said cone insulation comprising a blend of inorganic fibers and organic nanofibrillated fibers.

According to certain illustrative embodiments, the end cone for an exhaust gas treatment device comprises an outer metallic cone, an inner metallic cone, and cone insulation disposed between said outer and inner metallic cones, said cone insulation comprising inorganic fibers, organic nanofibrillated fibers, and intumescent material.

Also provided is an exhaust gas treatment device comprising a housing; a fragile structure located within the housing; and a mounting mat disposed in a gap between said housing and said fragile structure; a double walled end cone housing; and a mat or molded three dimensional insulation pre-form disposed between the walls of the end cone hosing, said mat or pre-form comprising a blend of inorganic fibers and organic nanofibrillated fibers.

Additionally provided is an end cone for an exhaust gas treatment device comprising outer metallic cone; an inner metallic cone; and a mat or molded three dimensional insulation pre-form disposed between said outer and inner metallic end cones, said mat or pre-form comprising a blend of inorganic fibers and organic nanofibrillated fibers.

Further provided is a method for making an end cone for an exhaust gas treatment device, the method comprising disposing a mat or molded three dimensional insulation pre-form between the outer and inner metallic end cones, said mat or pre-form comprising a blend of inorganic fibers and organic nanofibrillated fibers.

According to certain embodiments, provided is an end cone for an exhaust gas treatment device. The end cones are of a double walled structure having an inner end cone housing and an outer end cone housing. A mat or vacuum formed insulation pre-form is disposed in the gap or space between the inner and outer end cone housings. The mat or vacuum formed pre-form comprises a blend of inorganic fibers and organic nanofibrillated fibers.

Further provided is a double-walled automotive exhaust gas pipe comprising an outer metallic pipe, an inner metallic pipe, and pipe insulation disposed between said outer and inner metallic pipes, said pipe insulation comprising inorganic fibers, organic nanofibrillated fibers, and optionally intumescent material.

A mat for exhaust gas treatment devices and thermal insulation applications is disclosed. The mat comprises at least one ply or sheet that is comprised of a blend or mixture of heat resistant inorganic fibers and organic nanofibrillated fibers. According to certain illustrative embodiments, the mat may further include intumescent material.

A device for treating exhaust gases is also provided. The device includes an outer metallic housing, at least one fragile structure that is mounted within the housing by a mounting mat that is disposed between the inner surface of the housing and the outer surface of the fragile structure. The term "fragile structure" is intended to mean and include structures such as metal or ceramic monoliths or the like which may be fragile or frangible in nature, and would benefit from a mounting mat as described herein.

According to illustrative embodiments, the exhaust gas treatment device comprises a catalytic converter. The catalytic converter for treating exhaust gases of an automotive engine includes a housing, a fragile catalyst support structure for holding the catalyst that is used to treat exhaust gases and a mounting mat disposed between the outer surface of the fragile catalyst support structure and the inner surface of the housing to resiliently hold the fragile catalyst support structure within the housing. The mounting mat comprises at least one sheet of a mixture of inorganic fibers and organic nanofibrillated fibers.

According to other illustrative embodiments, the exhaust gas treatment device comprises a diesel particular trap. The diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing. The mounting mat for the diesel particulate trap comprises a mixture of inorganic fibers and organic nanofibrillated fibers.

Catalyst structures generally include one or more porous tubular or honeycomb-like structures mounted by a thermally resistant material within a housing. Each structure includes anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat may include catalytic converters for chemical industry emission (exhaust) stacks.

Figure 1:
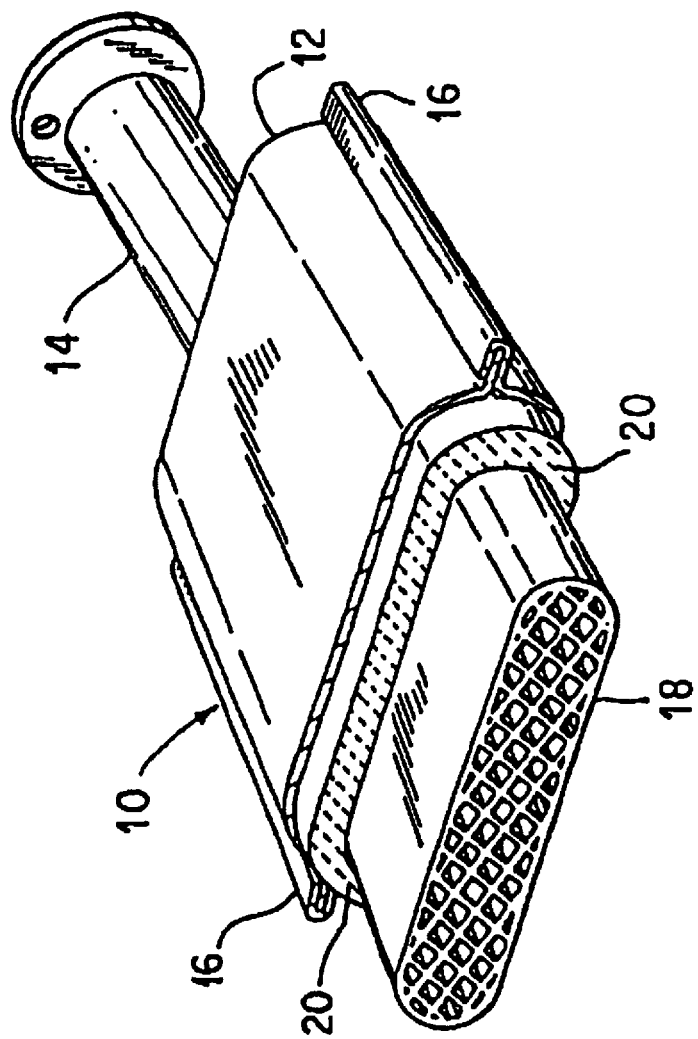
FIG. 1 shows a fragmentary view of an illustrative exhaust gas treatment device including the inventive mounting mat.

One illustrative form of a device for treating exhaust gases is designated by the numeral 10 in FIG. 1. It should be understood that the mounting mat is not intended to be limited to use in the device shown in FIG. 1, and so the shape is shown only as an illustrative embodiment. In fact, the mounting mat could be used to mount or support any fragile structure suitable for treating exhaust gases, such as a diesel catalyst structure, a diesel particulate trap, or the like.

Catalytic converter 10 may include a generally tubular housing 12 formed of two pieces of metal, for example, high temperature resistant steel, held together by flange 16. Alternatively, the housing may include a preformed canister into which a mounting mat-wrapped fragile structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile structure, such as a frangible ceramic monolith 18, which is supported and restrained within housing 12 by a mounting mat 20. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from inner surfaces of the housing by a distance or a gap, which will vary according to the type and design of the device utilized, for example, a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the fragile structure, thereby protecting the fragile structure from mechanical shock across a wide range of exhaust gas treatment device operating temperatures.

The composition of the mounting mat 20 is sufficient to provide a holding pressure capability to resiliently hold the fragile catalyst support structure 18 within a housing 12 of an exhaust gas treatment device 10 throughout a wide temperature range.

According to further illustrative embodiments, the mat comprising a mixture of heat resistant inorganic fibers and organic nanofibrillated fibers may be used in automotive exhaust gas pipes. For example, and without limitation, the mat comprising a mixture of heat resistant inorganic fibers and organic nanofibrillated fibers may be used in a double-walled exhaust gas pipe. The double-walled exhaust gas pipe includes an elongated inner metallic pipe and an elongated outer metallic pipe that is spaced apart from the inner metallic pipe. Positioned between the outer surface of the inner metallic pipe and the inner surface of the outer metallic pipe is at least one layer of a mat comprising a mixture of heat resistant inorganic fibers and organic nanofibrillated fibers.

Nanofibrillated fibers may be produced in many ways. For example, nanofibrillated fibers may be produced using chemical, enzymatic and/or mechanical methods. Fibers may be processed using a controlled acid hydrolysis or treated with enzymes such as cellulases or hemicellulases and may then be exposed to refining, beating, and/or grinding, such as in a homogenizer. Many of the processes which are utilized to manufacture nanofibrillated fibers mechanically and/or chemically break down larger fibers such that nanofibrils which make up the larger fiber are separated from one another. In some cases, these nanofibrils form a web- or pulp-like structure. In other instances, the nanofibrils may be completely separated from the larger structure, creating nanofibers.

As used herein, the term "nanofibrillated fibers" refers to fibers which have undergone a process which results in the creation of nanofibers and/or nanofibrils, wherein the majority of the nanofibers and/or nanofibrils have a diameter of less than 1 μm (1,000 nm). In certain embodiments, greater than 60% of the nanofibers and/or nanofibrils have a diameter less than 1 μm (1,000 nm). In certain embodiments, greater than 70% of the nanofibers and/or nanofibrils have a diameter less than 1 μm (1,000 nm). In certain embodiments, greater than 80% of the nanofibers and/or nanofibrils have a diameter less than 1 μm (1,000 nm). In certain embodiments, greater than 90% of the nanofibers and/or nanofibrils have a diameter less than 1 μm (1,000 nm). In certain embodiments, substantially all of the nanofibers and/or nanofibrils have a diameter less than 1 μm (1,000 nm).

The nanofibrillated fibers may be prepared from any organic fibers which are capable of undergoing nanofibrillation and which would be suitable for use in the subject mounting mats. The nanofibrillated fibers may be prepared, for example, from acrylic, natural cellulose, and/or regenerated cellulosic materials. These fibers may comprise a wide range of fibril lengths and fibrillation levels. For example, the fibers may comprise nanofibers and/or nanofibrils having an average length of from about 1 mm to about 8 mm, and/or the nanofibrillated fibers may have a Canadian Standard Freeness of about 200 or less. In certain embodiments, the nanofibrillated fibers may have a Canadian Standard Freeness of about 40 or less. In further embodiments, the nanofibrillated fibers may have a Canadian Standard Freeness of about 10 or less. The nanofibers and/or nanofibrils may have an average diameter in the range from about 50 nm to about 500 nm.

Without limitation, nanofibrillated fibers which may be used in the present mat are commercially available from Engineered Fibers Technology (Shelton, Conn., USA) under the trade designation EFTec nanofibrillated fibers. These nanofibrillated fibers have a high aspect ratio (surface area: volume). In certain embodiments, the nanofibrillated fibers may have an aspect ratio of about 1,000 or greater. Without being bound to any particular theory, because of the high aspect ratio of nanofibrillated fibers in general, it is thought that only a small amount of nanofibrillated fibers may be needed to effectively bond the inorganic fibers of the mat together. Again, without being bound by any particular theory, it is thought that nanofibrillated fibers form hydrogen bonds and/or van der Waal's type attractions with other components in the mounting mat. Because of their small size, nanofibrillated fibers may be capable of having a greater number of contact points for bonding compared with larger diameter fibers.

Any heat resistant inorganic fibers may be blended with the organic nanofibrillated fibers and utilized in the mounting mat so long as the fibers can withstand the mounting mat forming process, can withstand the operating temperatures of the exhaust gas treatment devices, and can provide the minimum holding pressure performance for holding a fragile structure within an exhaust gas treatment device housing at typical operating temperatures. Without limitation, suitable inorganic fibers that may be used to prepare the mounting mat and exhaust gas treatment device include high alumina polycrystalline fibers, refractory ceramic fibers such as aluminosilicate fibers, alumina-magnesia-silica fibers, kaolin fibers, alkaline earth silicate fibers such as calcia-magnesia-silica fibers and magnesia-silica fibers, S-glass fibers, S2-glass fibers, E-glass fibers, quartz fibers, silica fibers and combinations of one or more of these fibers.

According to certain embodiments, the heat resistant inorganic fibers that are used to prepare the mounting mat comprise ceramic fibers. Without limitation, suitable ceramic fibers include alumina fibers, alumina-silica fibers, alumina-zirconia-silica fibers, zirconia-silica fibers, zirconia fibers and similar fibers. A useful alumina-silica ceramic fiber is commercially available from Unifrax I LLC (Niagara Falls, N.Y.) under the trademark FIBERFRAX®. The FIBERFRAX® ceramic fibers comprise the fiberization product of about 45 to about 75 weight percent alumina and about 25 to about 55 weight percent silica. The FIBERFRAX® fibers are able to withstand operating temperatures of up to about 1540° C. and a melting point up to about 1870° C. The FIBERFRAX® fibers are easily formed into high temperature resistant sheets and papers.

The alumina/silica fiber may comprise from about 40 weight percent to about 60 weight percent $Al_2O_3$ and about 60 weight percent to about 40 weight percent $SiO_2$. The fiber may comprise about 50 weight percent $Al_2O_3$ and about 50 weight percent $SiO_2$. The alumina/silica/magnesia glass fiber typically comprises from about 64 weight percent to about 66 weight percent $SiO_2$, from about 24 weight percent to about 25 weight percent $Al_2O_3$, and from about 9 weight percent to about 10 weight percent MgO. The E-glass fiber typically comprises from about 52 weight percent to about 56 weight percent $SiO_2$, from about 16 weight percent to about 25 weight percent CaO, from about 12 weight percent to about 16 weight percent $Al_2O_3$, from about 5 weight percent to about 10 weight percent $B_2O_3$, up to about 5 weight percent MgO, up to about 2 weight percent of sodium oxide and potassium oxide and trace amounts of iron oxide and fluorides, with a typical composition of 55 weight percent $SiO_2$, 15 weigh percent $Al_2O_3$, 7 weight percent $B_2O_3$, 3 weight percent MgO, 19 weight percent CaO and traces of the above mentioned materials.

Without limitation, suitable examples of biosoluble alkaline earth silicate fibers that can be used to prepare a mounting mat for an exhaust gas treatment device include those fibers disclosed in U.S. Pat. Nos. 6,953,757, 6,030,910, 6,025,288, 5,874,375, 5,585,312, 5,332,699, 5,714,421, 7,259,118, 7,153,796, 6,861,381, 5,955,389, 5,928,075, 5,821,183, and 5,811,360, which are incorporated herein by reference.

According to certain embodiments, the biosoluble alkaline earth silicate fibers may comprise the fiberization product of a mixture of oxides of magnesium and silica. These fibers are commonly referred to as magnesium-silicate fibers. The magnesium-silicate fibers generally comprise the fiberization product of about 60 to about 90 weight percent silica, from greater than 0 to about 35 weight percent magnesia and 5 weight percent or less impurities. According to certain embodiments, the alkaline earth silicate fibers comprise the fiberization product of about 65 to about 86 weight percent silica, about 14 to about 35 weight percent magnesia and 5 weight percent or less impurities. According to other embodiments, the alkaline earth silicate fibers comprise the fiberization product of about 70 to about 86 weight percent silica, about 14 to about 30 weight percent magnesia, and 5 weight percent or less impurities. A suitable magnesium-silicate fiber is commercially available from Unifrax I LLC (Niagara Falls, N.Y.) under the registered trademark ISOFRAX. Commercially available ISOFRAX fibers generally comprise the fiberization product of about 70 to about 80 weight percent silica, about 18 to about 27 weight percent magnesia and 4 weight percent or less impurities.

According to certain embodiments, the biosoluble alkaline earth silicate fibers may comprise the fiberization product of a mixture of oxides of calcium, magnesium and silica. These fibers are commonly referred to as calcia-magnesia-silica fibers. According to certain embodiments, the calcia-magnesia-silicate fibers comprise the fiberization product of about 45 to about 90 weight percent silica, from greater than 0 to about 45 weight percent calcia, from greater than 0 to about 35 weight percent magnesia, and 10 weight percent or less impurities. Useful calcia-magnesia-silicate fibers are commercially available from Unifrax I LLC (Niagara Falls, N.Y.) under the registered trademark INSULFRAX. INSULFRAX fibers generally comprise the fiberization product of about 61 to about 67 weight percent silica, from about 27 to about 33 weight percent calcia, and from about 2 to about 7 weight percent magnesia. Other suitable calcia-magnesia-silicate fibers are commercially available from Thermal Ceramics (Augusta, Ga.) under the trade designations SUPERWOOL 607, SUPERWOOL 607 MAX and SUPERWOOL HT. SUPERWOOL 607 fibers comprise about 60 to about 70 weight percent silica, from about 25 to about 35 weight percent calcia, and from about 4 to about 7 weight percent magnesia, and trace amounts of alumina. SUPERWOOL 607 MAX fibers comprise about 60 to about 70 weight percent silica, from about 16 to about 22 weight percent calcia, and from about 12 to about 19 weight percent magnesia, and trace amounts of alumina. SUPERWOOL HT fiber comprise about 74 weight percent silica, about 24 weight percent calcia and trace amounts of magnesia, alumina and iron oxide.

Suitable silica fibers use in the production of a mounting mat for an exhaust gas treatment device include those leached glass fibers available from BelChem Fiber Materials GmbH, Germany, under the trademark BELCOTEX, from Hitco Carbon Composites, Inc. of Gardena Calif., under the registered trademark REFRASIL, and from Polotsk-Steklovolokno, Republic of Belarus, under the designation PS-23(R).

The BELCOTEX fibers are standard type, staple fiber preyarns. These fibers have an average fineness of about 550 tex and are generally made from silicic acid modified by alumina. The BELCOTEX fibers are amorphous and generally contain about 94.5 silica, about 4.5 percent alumina, less than 0.5 percent sodium oxide, and less than 0.5 percent of other components. These fibers have an average fiber diameter of about 9 microns and a melting point in the range of 1500° to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000° to 1100° C. temperature range. These fibers are between about 6 and about 13 microns in diameter, and have a melting point of about 1700° C. The fibers, after leaching, typically have a silica content of about 95 percent by weight. Alumina may be present in an amount of about 4 percent by weight with other components being present in an amount of 1 percent or less.

The PS-23 (R) fibers from Polotsk-Steklovolokno are amorphous glass fibers high in silica content and are suitable for thermal insulation for applications requiring resistance to at least about 1000° C. These fibers have a fiber length in the range of about 5 to about 20 mm and a fiber diameter of about 9 microns. These fibers, like the REFRASIL fibers, have a melting point of about 1700° C.

The intumescent material that may be incorporated into the mounting mat includes, without limitation, unexpanded vermiculite, ion-exchanged vermiculite, heat treated vermiculite, expandable graphite, hydrobiotite, water-swelling tetrasilicic flourine mica, alkaline metal silicates, or mixtures thereof. The mounting mat may include a mixture of more than on type of intumescent material. The intumescent material may comprise a mixture of unexpanded vermiculite and expandable graphite in a relative amount of about 9:1 to about 1:2 vermiculite:graphite, as described in U.S. Pat. No. 5,384,188.

The mounting mat may also include a binder or mixture of more than one type of binder different from the organic nanofibrillated fibers. Suitable binders include organic binders that are different from the organic nanofibrillated fibers, inorganic binders and mixtures of these two types of binders. According to certain embodiments, the intumescent mounting mat, includes one or more organic binders that are different from the organic nanofibrillated fibers. The organic binders may be provided as a solid, a liquid, a solution, a dispersion, a latex, an emulsion, or similar form. The organic binder may comprise a thermoplastic or thermoset binder, which after cure is a flexible material that can be burned out of an installed mounting mat. Examples of suitable organic binders include, but are not limited to, acrylic latex, (meth) acrylic latex, copolymers of styrene and butadiene, vinylpyridine, acrylonitrile, copolymers of acrylonitrile and styrene, vinyl chloride, polyurethane, copolymers of vinyl acetate and ethylene, polyamides, silicones, and the like. Other resins include low temperature, flexible thermosetting resins such as unsaturated polyesters, epoxy resins and polyvinyl esters.

Typically, the organic binder is a sacrificial binder employed to initially bond the fibers together. By "sacrificial," it is meant that the organic binder will eventually be burned out of the mounting mat, leaving only the inorganic fibers, optionally intumescent material and optionally clay as the mounting mat for supporting the fragile structure within the metallic housing.

In addition to organic binders, the mounting mats may also include inorganic binder material. Without limitation, suitable inorganic binder materials include colloidal dispersions of alumina, silica, zirconia, and mixtures thereof.

According to illustrative embodiments, the mat comprises from about 25 weight percent to about 99.9 weight percent inorganic fibers, from about 0.1 weight percent to about 10 weight percent organic nanofibrillated fibers, from 0 to about 50 weight percent of at least one intumescent material, and 0 to about 10 weight percent of an organic binder different from the organic nanofibrillated fibers.

According to other embodiments, the mat comprises from about 40 weight percent to about 99.75 weight percent inorganic fibers, from about 0.25 weight percent to about 5 weight percent organic nanofibrillated fibers, from 0 to about 40 weight percent of at least one intumescent material, and 0 to about 8 weight percent of an organic binder different from the organic nanofibrillated fibers.

According to illustrative embodiments, the mat comprises from about 60 weight percent to about 99.5 weight percent inorganic fibers, from about 0.5 weight percent to about 2.5 weight percent organic nanofibrillated fibers, from 0 to about 30 weigh percent of at least one intumescent material, and from about 0 weight percent to about 5 weight percent of an organic binder different from the organic nanofibrillated fibers.

According to certain embodiments, the mounting mat may include an effective amount of a clay material to further minimize the decrease in overall mat thickness, and corresponding low temperature performance loss, due to organic binder softening and fiber rearrangement. Suitable clays that mat be included in the intumescent mounting mat include, without limitation, attapulgite, ball clay, bentonite, hectorite, kyanite, kaolinite, montmorillonite, palygorskite, saponite, sepiolite, silimanite, or combinations thereof.

The mounting mat may be produced in any way known in the art for forming sheet-like materials. For example, conventional paper-making processes, either hand laid or machine laid, may be used to prepare the intumescent sheet material. A handsheet mold, a Fourdrinier paper machine, or a rotoformer paper machine can be employed to make the intumescent sheet material.

For example, using a papermaking process, the inorganic fibers, organic nanofibrillated fibers, and optionally intumescent material may be mixed together with a binder or other fibers capable of acting as a binder to form a mixture or slurry. The slurry of components may be flocculated by adding a flocculating agent to the slurry. The flocculated mixture or slurry is placed onto a papermaking machine to be formed into a ply or sheet of fiber containing paper. The sheet is dried by air drying or oven drying. For a more detailed description of standard papermaking techniques employed, see U.S. Pat. No. 3,458,329, the disclosure of which is incorporated herein by reference.

Alternatively, the plies or sheets may be formed by vacuum casting the slurry. According to this method, the slurry of components is wet laid onto a pervious web. A vacuum is applied to the web to extract the majority of the moisture from the slurry, thereby forming a wet sheet. The wet plies or sheets are then dried, typically in an oven. The sheet may be passed through a set of rollers to compress the sheet prior to drying.

In other embodiments, the fibers may be processed into a mounting mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size.

It is noted that mounting mats may be too low in density for easy use in certain applications. Therefore, they may undergo further densification by any manner known in the art to provide a higher density. One such manner of densification is to needle punch the fibers so as to intertwine and entangle them. Additionally or alternatively, hydro-entangling methods may be used. Another alternative is to press the fibers into a mat form by rolling them through press rollers. Any of these methods of densification of the mats or a combination of these methods can be readily used to obtain a mounting mat of the desired form.

Regardless of which of the above-described techniques are employed, the composite may be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the fragile structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

The following examples are set forth merely to further illustrate the mounting mat and exhaust gas treatment device. The illustrative examples should not be construed as limiting the mounting mat, exhaust gas treatment device incorporating the mounting mat, or the methods of making the mounting mat or the exhaust gas treatment device in any manner.

Comparative Example No. 1 represents a mounting mat comprising 154 g Isofrax® magnesia-silica fibers, 40 g expandable vermiculite, and 6 g acrylic latex. Comparative Example No. 1 did not contain any organic nanofibrillated fiber.

Example No. 2 represents a mounting mat comprising 152 g Isofrax® magnesia-silica fibers, 40 g expandable vermiculite, 6 g acrylic latex, and 2 g cellulose nanofibrillated fiber.

Example No. 3 represents a mounting mat comprising 148 g Isofrax® magnesia-silica fibers, 40 g expandable vermiculite, 6 g acrylic latex, and 6 g cellulose nanofibrillated fiber.

Example No. 4 represents a mounting mat comprising 144 g Isofrax® magnesia-silica fibers, 40 g expandable vermiculite, 6 g acrylic latex, and 10 g cellulose nanofibrillated fiber.

Each of the above mats were evaluated by tensile testing to determine the stress at yield. Samples of each mat were prepared by cutting 1 inch by 8 inch strips from a larger mat material. Each sample was weighed and the thickness was measured. Each sample was clamped to the tensile grips of a mechanical testing machine. The results are reported in Table I below.

TABLE I

| Example | % Nanofibrillated Fiber | Stress at Yield (psi) |
| --- | --- | --- |
| C1 | 0 | 10.347 |
| 2 | 1 | 17.362 |
| 3 | 3 | 35.100 |
| 4 | 5 | 46.330 |

These mats are advantageous to the catalytic converter and diesel particulate trap industry. The mounting mats can be die cut and are operable as resilient supports in a thin profile, providing ease of handling in a flexible form, so as to be able to provide a total wrap of the catalyst support structure, if desired, without cracking. Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperature, including during thermal cycling.

According to other embodiments, the exhaust gas treatment device includes an outer metallic housing, at least one fragile structure that is mounted within the housing by a mounting mat that is disposed between the inner surface of the housing and the outer surface of the fragile structure, and end cones located at the inlet and outlet regions of the device. The end cone regions are of a double walled structure having an inner end cone housing and an outer end cone housing. A mat or vacuum formed insulation pre-form is disposed in the gap or space between the inner and outer end cone housings. The mat or vacuum formed pre-form comprises a blend of inorganic fibers and organic nanofibrillated fibers.

Any suitable type of molding technique or mold known in the art can be used to prepare a pre-form. In some applications, the molded three-dimensional end cone insulation pre-form can be prepared using a vacuum forming technique. A slurry of fibers, organic binder, inorganic colloidal material and water is prepared. A permeable forming die is placed in the slurry of fibers, binder, inorganic colloidal material, water and any other desired components. A three-dimensional pre-from is vacuum formed from the slurry on the permeable forming die. The solids in the slurry can deposit on the surface of the forming die when a vacuum is drawn to form a three-dimensional pre-form cone have a substantially uniform thickness and uncompressed basis weight across the cone. The pre-form is removed from the slurry and dried.

According to other embodiments, the end cone may comprise an outer metallic cone and at least one layer of cone insulation that is positioned adjacent to the inner surface of the outer metallic cone. According to these embodiments, the end cone assembly is not provided with an inner metallic cone. Rather, the cone insulation is rigidized in some manner to provide a self-supporting cone structure that is resistant to the high temperature gases flowing through the device.

Figure 2:
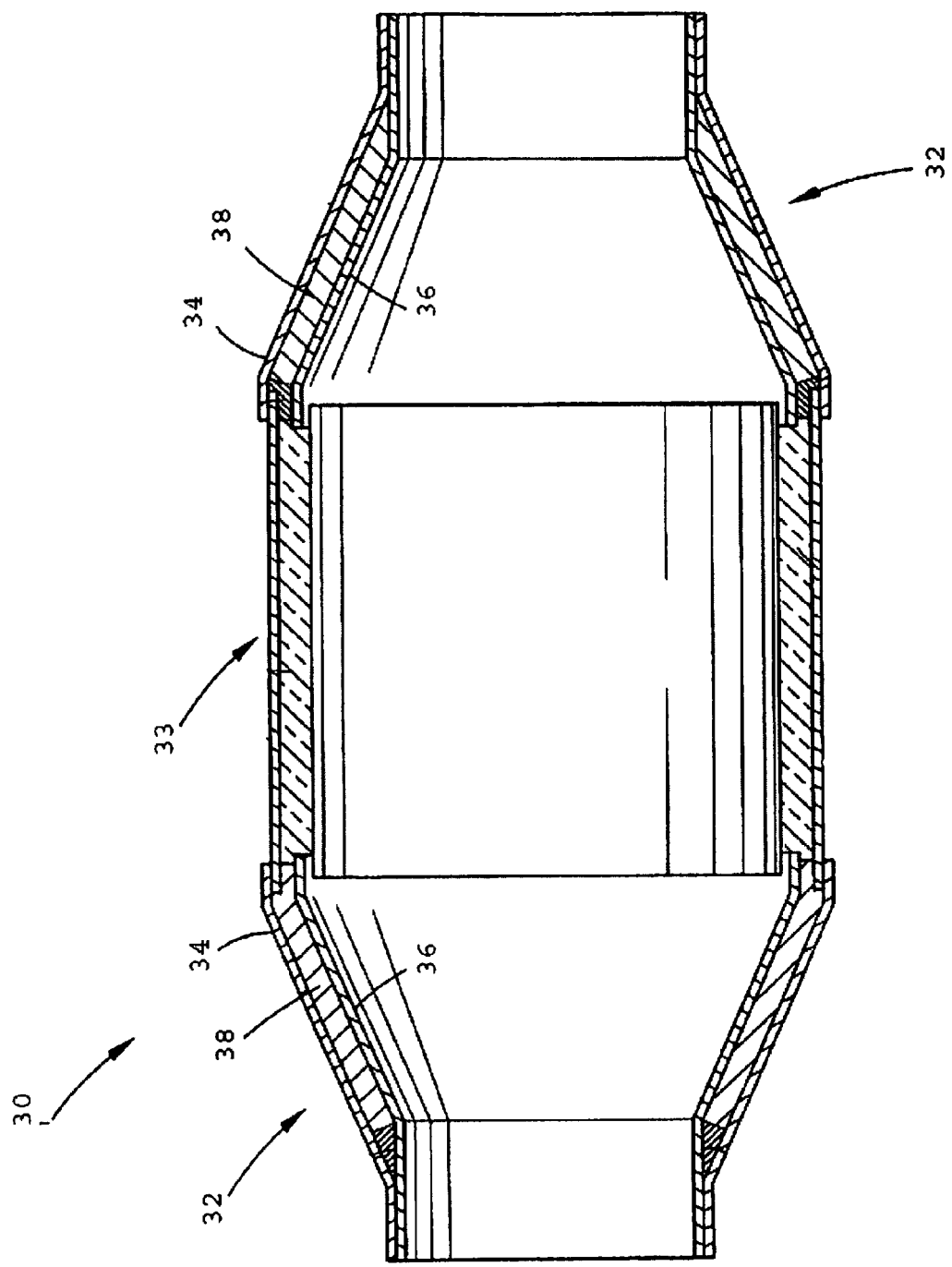
FIG. 2 shows an illustrative exhaust gas treatment device with end cones cone regions.

An exhaust gas treatment device including at least one end cone is provided. The exhaust gas treatment device comprises a housing, a fragile structure positioned within the housing, inlet and outlet end cone assemblies for attaching exhaust pipes to the housing, each end cone assembly comprising an inner end cone housing and an outer end cone housing, and end cone insulation comprising inorganic fibers, organic nanofibrillated fibers and optionally intumescent material positioned between the inner and outer cone housings. An illustrative exhaust gas treatment device is shown in FIG. 2. Exhaust gas treatment device 30 includes end cones 32 flanking a middle region 33. End cones 30 include outer metallic cone 34 and inner metallic cone 36. Positioned between the inner surface of outer metallic cone 34 and the outer surfaces of inner metallic cone 36 is end cone insulation 38.

Figure 3:
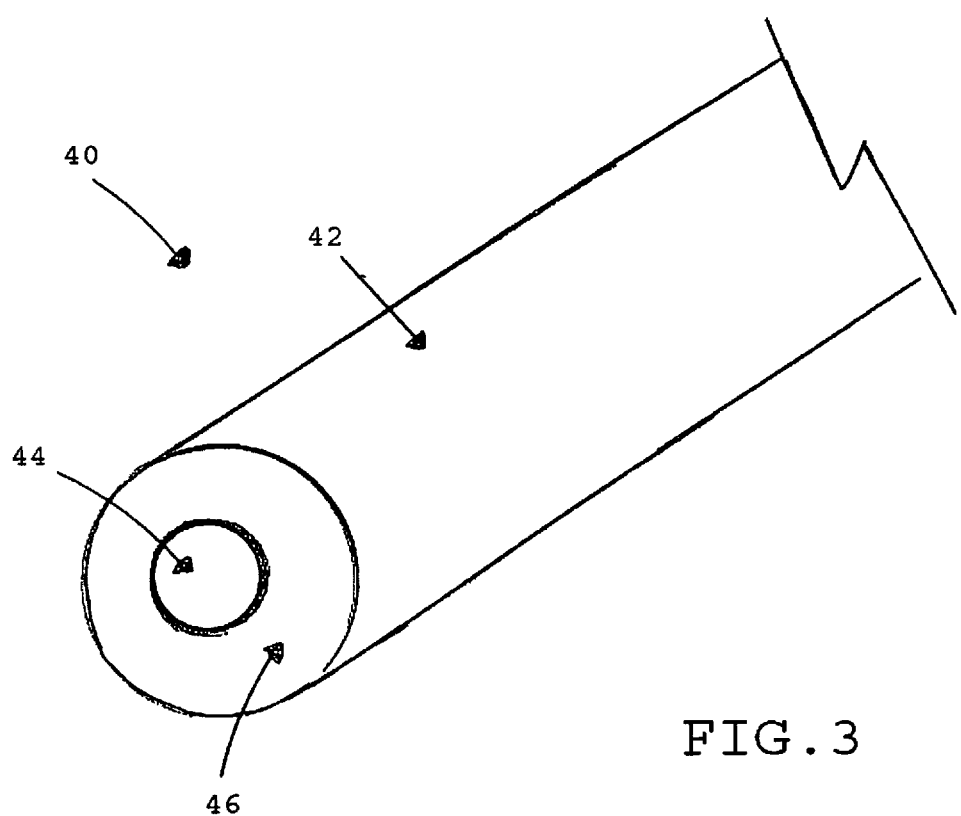
FIG. 3 shows an illustrative double-walled exhaust gas pipe.

The mat or pre-form may also be used as insulation in a double-walled automotive exhaust gas conduit or pipe. An illustrative exhaust gas pipe is shown in FIG. 3. Exhaust gas pipe 40 includes outer metallic wall 42 and inner metallic wall 44. Positioned between the inner surface of outer metallic wall 42 and the outer surfaces of inner metallic wall 44 is insulation 46.

The mounting mats described above can also be used in catalytic converters employed in the chemical industry which are located within exhaust or emission stacks, including those which contain fragile honeycomb type structures that need to be protectively mounted.

The mounting mat material may be used as passive fire protection or as a fire stop material. The mounting mats may also be used to wrap heat generating elements within fuel cells.

While the mounting mat and exhaust gas treatment device have been described in connection with various illustrative embodiments, it is to be understood that other similar embodiments may be used or modifications and additions may be made to the described embodiments for performing the same function disclosed herein without deviating therefrom. The embodiments described above are not necessarily in the alternative, as various embodiments may be combined to provide the desired characteristics. Therefore, the mounting mat and exhaust gas treatment device should not be limited to any single embodiment, but rather construed in breadth and scope in accordance with the recitation of the appended claims.

The invention claimed is:

1. A mounting mat for holding a fragile structure within the housing of an exhaust gas treatment device comprising a blend of inorganic fibers and organic nanofibrillated fibers.

2. The mounting mat of claim 1, wherein the inorganic fibers are selected from the group consisting of high alumina polycrystalline fibers, ceramic fibers, mullite fibers, glass fibers, biosoluble fibers, quartz fibers, silica fibers, and blends thereof.

3. The mounting mat of claim 2, wherein the high alumina polycrystalline fibers comprise the fiberization product of about 72 to about 100 weight percent alumina and about 0 to about 28 weight percent silica.

4. The mounting mat of claim 2, wherein the ceramic fibers comprise alumino-silicate fibers comprising the fiberization product of about 45 to about 72 weight percent alumina and about 28 to about 55 weight percent silica.

5. The mounting mat of claim 2, wherein the biosoluble fibers comprise magnesia-silica fibers comprising the fiberization product of about 65 to about 86 weight percent silica, from about 14 to about 35 weight percent magnesia and about 5 weight percent of less impurities.

6. The mounting mat of claim 2, wherein the biosoluble fibers comprise calcia-magnesia-silica fibers comprising the fiberization product of about 45 to about 90 weight percent silica, greater than 0 to about 45 weight percent calcia, and greater than 0 to about 35 weight percent magnesia.

7. The mounting mat of claim 1, wherein the majority of the organic nanofibrillated fibers have a diameter of less than 1 μm.

8. The mounting mat of claim 1, wherein greater than 80% of the organic nanofibrillated fibers have diameter of less than 1 μm.

9. The mounting mat of claim 1, wherein substantially all of the organic nanofibrillated fibers have a diameter of less than 1 μm.

10. The mounting mat of claim 1, wherein the organic nanofibrillated fibers have an average diameter of from about 50 nm to about 500 nm.

11. The mounting mat of claim 1, wherein the mat comprises from about 25 weight percent to about 90 weight percent of said inorganic fibers, based on the total weight of the mat.

12. The mounting mat of claim 11, wherein the mat comprises from about 40 to about 90 weight percent of said inorganic fibers, based on the total weight of the mat.

13. The mounting mat of claim 12, wherein the mat comprises from about 60 to about 90 weight percent of said inorganic fibers, based on the total weight of the mat.

14. The mounting mat of claim 1, wherein the mat comprises from about 0.1 weight percent to about 10 weight percent of said organic nanofibrillated fibers, based on the total weight of the mat.

15. The mounting mat of claim 14, wherein the mat comprises from about 0.25 weight percent to about 5 weight percent of said organic nanofibrillated fibers, based on the total weight of the mat.

16. The mounting mat of claim 14, wherein the mat comprises from about 0.5 weight percent to about 2.5 weight percent of said organic nanofibrillated fibers, based on the total weight of the mat.

17. The mounting mat of claim 1, wherein said organic nanofibrillated fibers comprise at least one of acrylic nanofibrillated fibers, natural cellulose nanofibrillated fibers, or regenerated cellulose nanofibrillated fibers.

18. The mounting mat of claim 17, wherein said mounting mat comprising greater than 0 to about 10 weight percent cellulose nanofibrillated fibers.

19. The mounting mat of claim 1, wherein said mounting mat comprises an intumescent material.

20. The mounting mat of claim 19, wherein the intumescent material is selected from the group consisting of unexpanded vermiculite, ion exchanged vermiculite, heat treated vermiculite, expandable graphite, hydrobiotite, water-swelling tetrasilicic flourine mica, alkaline metal silicates, or mixtures thereof.

21. The mounting mat of claim 19, wherein the intumescent material comprises unexpanded vermiculite.

22. The mounting mat of claim 1, wherein said mounting mat comprises a clay selected from the group consisting of attapulgite, ball clay, bentonite, hectorite, kyanite, kaolinite, montmorillonite, palygorskite, saponite, sepiolite, silimanite or combinations thereof.

23. The mounting mat of claim 1, wherein said mounting mat comprises an organic binder different from the organic nanofibrillated fibers.

24. The mounting mat of claim 23, wherein said organic binder comprises an acrylic latex.

* * * * *